(12) United States Patent
Sivakumar et al.

(10) Patent No.: US 11,336,936 B2
(45) Date of Patent: May 17, 2022

(54) SYSTEMS AND METHODS FOR TIME-SHIFTED PREFETCHING OF PREDICTED CONTENT FOR WIRELESS USERS

(71) Applicant: Georgia Tech Research Corporation, Atlanta, GA (US)

(72) Inventors: Raghupathy Sivakumar, Atlanta, GA (US); Shruti Lall, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 36 days.

(21) Appl. No.: 17/317,581

(22) Filed: May 11, 2021

(65) Prior Publication Data
US 2021/0352346 A1 Nov. 11, 2021

Related U.S. Application Data

(60) Provisional application No. 63/022,641, filed on May 11, 2020.

(51) Int. Cl.
*H04N 21/25* (2011.01)
*H04N 21/258* (2011.01)
*H04N 21/61* (2011.01)

(52) U.S. Cl.
CPC ..... *H04N 21/251* (2013.01); *H04N 21/25891* (2013.01); *H04N 21/6106* (2013.01)

(58) Field of Classification Search
None
See application file for complete search history.

*Primary Examiner* — Justin E Shepard
(74) *Attorney, Agent, or Firm* — Troutman Pepper Hamilton Sanders LLP; Ryan A. Schneider

(57) ABSTRACT

The disclosed technology includes systems and methods for time-shifted prefetching of predicted content for wireless users. The disclosed technology can include a method of prefetching video data. The method can include retrieving video data and feature data and generating a video candidate set comprising selected videos. The method can include determining principal components of each video in the video candidate set by performing a principal component analysis. Furthermore, the method can include determining predicted videos using a k-nearest neighbor classifier. The predicted videos can be videos of the video candidate set that are likely to be viewed by a user at a future time. The method can include outputting instructions to the user device to prefetch the predicted videos by downloading the predicted videos to the user device.

20 Claims, 8 Drawing Sheets

300

---

Algorithm 1: Prefetching training algorithm

1. INPUT: *videos* DB; preferred channels and categories per user; *training_period*; *generation_period*
2. OUTPUT: trained classifier
3. PROCEDURE
4. for each *day* in training period
5.    *generation_period_start* ← *day* - *generation_period*
6.    *past_videos* ← videos watched (*generation_period_start* to *day*)
7.    for each *video* in *past_videos*
8.       *related_video_list* ← relatedToVideo(*video*)
9.       for each *rv* in *related_video_list*
10.          if *rv* is in *videos* DB
11.             *metadata* ← corresponding *videos* DB entry
12.          else
13.             *metadata* ← videos_list_by_id(*rv*)
14.             Add *metadata* to *videos* DB
15.          end if
16.          if *rv*'s channel or category is preferred
17.             Add *rv metadata* to *candidate set*
18.          end if
19.       end for
20.    end for
21.    *current_videos* ← videos watched on *day*
22.    Set *class* to *discarded* for all videos in *candidate set*
23.    for each *video* in *cadidate set*
24.       if *video* in *current_videos*
25.          *class* ← *chosen*
26.       end if
27.    end for
28.    Add *candidate set* to *training data* for classifier
29. end for
30. Apply PCA to *training data*
31. Load *training data* into classifier

| Feature | Description |
|---|---|
| Retrieval date | Date of when the *video* from which the related videos are obtained, was watched |
| Time difference | Time difference between *video* upload date and prefetching day |
| Views | No. of views of *video* |
| Likes | No. of likes of *video* |
| Dislikes | No. of dislikes of *video* |
| Comments | No. of comments of *video* |
| Channel ID | ID of the channel which uploaded *video* |
| Category ID | ID of the category of *video* |
| Subscribers | No. of subscribers *video*'s channel |
| Uploads | No. of videos uploaded by *video*'s channel |
| Subscribed | A boolean flag that is set if the user has subscribed to the *video*'s channel |
| Repeats | No. of times the *video* has been viewed |
| Duration | Duration of the *video* |
| Playlist | A boolean flag that is set if the *video* appears in a user's created playlists |
| Tags | Tags associated with the *video* |

FIG. 4

SYSTEMS AND METHODS FOR TIME-SHIFTED PREFETCHING OF PREDICTED CONTENT FOR WIRELESS USERS

CROSS-REFERENCE TO RELATED APPLICATIONS

This application claims the benefit of U.S. Provisional Patent Application No. 63/022,641 filed 11 May 2020, the contents of which are hereby incorporated by reference as if fully set forth below.

FIELD OF DISCLOSURE

The disclosed technology relates generally to systems and methods for prefetching content for wireless users.

BACKGROUND

The load on wireless cellular networks is not uniformly distributed throughout the day and can be significantly higher during peak periods. Wireless service providers typically upgrade their infrastructure and add spectrum in reaction to load characteristics on their networks. It can be typical for upgrades to a wireless provider's infrastructure to be triggered when there is a reasonably sustained peak usage that exceeds 80% of capacity.

Because wireless spectrum is expensive, several strategies exist to reduce peak load conditions. Examples of these strategies include reducing the load using compression and deduplication algorithms, improving the efficiency of the communication through protocol optimization, and disincentivizing users from imposing such peak loads by enforcing penalties. Although each of these methods can help reduce the peak load demand, the underlying problem of large variance in load demand still exists. Furthermore, none of these methods are capable of efficiently redistributing the load demand to off-peak load demand times.

One method of redistributing load demand to off-peak times is a method known as prefetching. Prefetching is a method of downloading data during off-peak times or on more cost-efficient networks such as Wi-Fi to proactively download data to a user's device before the data is demanded. Prefetching, however, has been limited in its application because it has generally been inefficient. For example, existing prefetching methods often download large amounts of data that is not wanted or needed by the end user resulting in an inefficient use of the wireless spectrum and leading to unnecessary costs. This problem can be exacerbated in the context of prefetching videos as the total amount of data that is prefetched can be large but the number of prefetched videos actually viewed by the user is often minimal. Thus, prefetching videos in particular can often be an inefficient use of the wireless spectrum.

What is needed, therefore, is a system and method that can efficiently redistribute the load demand on wireless networks to off-peak times while reducing the amount of data that is not needed or wanted by a wireless user. In other words, what is needed is a system and method that can proactively download data during off-peak times that a user will need or want to consume throughout the day.

SUMMARY

These and other problems can be addressed by the technologies described herein. Examples of the present disclosure relate generally to systems and methods for prefetching content for wireless users.

The disclosed technology can include a method of prefetching video data from a content provider server to a user device. The method can include retrieving user data. The user data can include a user's video watch history data, preferred channel data, and preferred category data. The method can include retrieving, from the content provider server, related video data based, at least in part, on the user's video watch history data. Furthermore, the method can include retrieving, from the related video data and the user's video watch history data, feature data. The feature data can include data indicative of features of each video in the related video data and the user's video watch history data.

The method can include generating, based at least in part on the user data and the feature data, a video candidate set that can include selected videos of the related video data. The method can include generating video candidate feature data comprising data indicative of features of each video in the video candidate set. The method can further include determining, based on the video candidate feature data, principal components of each video in the video candidate set by performing a principal component analysis of each video in the video candidate set. Furthermore, the method can include determining, based at least in part on the principal components and a k-nearest neighbor (KNN) classifier, predicted videos. The predicted videos can be a subset of videos of the video candidate set that are likely to be viewed by a user at a future time. The method can include outputting instructions to the user device to prefetch the predicted videos by downloading the predicted videos to the user device.

The method can further include determining whether a video of the video candidate set was viewed by the user. In response to determining that a video of the video candidate set was viewed by the user, the method can include generating an updated video candidate set.

The method can include determining, based on feature data of the updated video candidate set, updated principal components of each video in the updated video candidate set by performing the principal component analysis of each video in the updated video candidate set and outputting the updated principal components to the KNN classifier for training of the KNN classifier.

The user's video watch history data can include the user's video watch history data over a predetermined amount of time. The predetermined amount of time can be fourteen days prior to retrieving the user's video watch history data. The user's video watch history data can be retrieved from the content provider server or from the user device.

The related video data can comprise related video data that is based at least in part on each video in the user's video watch history data.

The method can include determining whether a wireless network is likely to have a current load demand that is less than a predetermined load demand threshold. The step of outputting instructions to the user device to prefetch the predicted videos by downloading the predicted videos to the user device can occur in response to determining that the wireless network is likely to have a current load demand less than the predetermined load demand threshold.

The predetermined load demand threshold can be based on a peak load demand. Furthermore, determining whether a wireless network is likely to have a current load demand that is less than a predetermined load demand threshold can be based, at least in part, on a time of day.

The method can include determining whether the user device is connected to a WiFi network. The step of outputting instructions to the user device to prefetch the predicted videos by downloading the predicted videos to the user device can occur in response to determining that the user device is connected to the WiFi network.

The disclosed technology can include a system for prefetching video data from a content provider server to a user device. The system can include one or more processors and a memory in communication with the one or more processors and storing instructions that, when executed by the one or more processors, cause the system to retrieve a user's video data. The video data can include video watch history data, preferred channel data, and preferred category data. The instructions can further cause the system to retrieve, from the content provider server, related video data based at least in part on the user's video watch history data. Furthermore, the instructions can cause the system to retrieve, from the related video data and the user's video watch history data, feature data comprising data indicative of features of each video in the related video data and the user's video watch history data.

The instructions can further cause the system to generate, based on the user data and the feature data, a video candidate set comprising selected videos of the related video data. The instructions can cause the system to generate video candidate feature data that can include data indicative of features of each video in the video candidate set. The instructions can cause the system to determine, based on the video candidate feature data of each video in the video candidate set, principal components of each video in the video candidate set by performing a principal component analysis of each video in the video candidate set. The instructions can further cause the system to determine, based at least in part on the principal components and a k-nearest neighbor (KNN) classifier, predicted videos, the predicted videos can be a subset of videos of the video candidate set that are likely to be viewed a user at a future time. The instructions can cause the system to output instructions to the user device to prefetch the predicted videos by downloading the predicted videos to the user device.

The instructions, when executed by the one or more processors, can further cause the system to determine whether a video of the video candidate set was viewed by the user. In response to determining that a video of the video candidate set was viewed by the user, the instructions can cause the system to generate an updated video candidate set and determine, based on feature data of the updated video candidate set, updated principal components of each video in the updated video candidate set by performing the principal component analysis of each video in the updated video candidate set. The instructions can cause the system to output the updated principal components to the KNN classifier for training of the KNN classifier.

The user's video watch history data can be retrieved from the content provider server or from the user device. The related video data can be related video data can be based, at least in part, on each video in the user's video watch history data.

The instructions, when executed by the one or more processors, can be further configured to further cause the system to determine whether a wireless network is likely to have a current load demand that is less than a predetermined load demand threshold. The step of outputting instructions to the user device to prefetch the predicted videos by downloading the predicted videos to the user device can occur in response to determining that the wireless network is likely to have a current load demand less than the predetermined load demand threshold.

The predetermined load demand threshold can be based, at least in part, on a peak load demand. Determining whether a wireless network is likely to have a current load demand that is less than a predetermined load demand threshold can be based, at least in part, on a time of day.

The instructions, when executed by the one or more processors, can be further configured to cause the system to determine whether the user device is connected to a WiFi network. The set of outputting instructions to the user device to prefetch predicted videos by downloading the predicted videos to the user device can occur in response to determining that the user device is connected to the WiFi network.

Additional features, functionalities, and applications of the disclosed technology are discussed herein in more detail.

BRIEF DESCRIPTION OF THE FIGURES

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

FIG. 3 is a table 300 showing pseudocode of a training portion of the method 200 that can be used to train a classifier used to prefetch content from a content provider server to a user device, in accordance with the disclosed technology.

FIG. 4 is a table showing some of the feature data downloaded from each video in a candidate set, in accordance with the disclosed technology.

DETAILED DESCRIPTION

Figure 1:
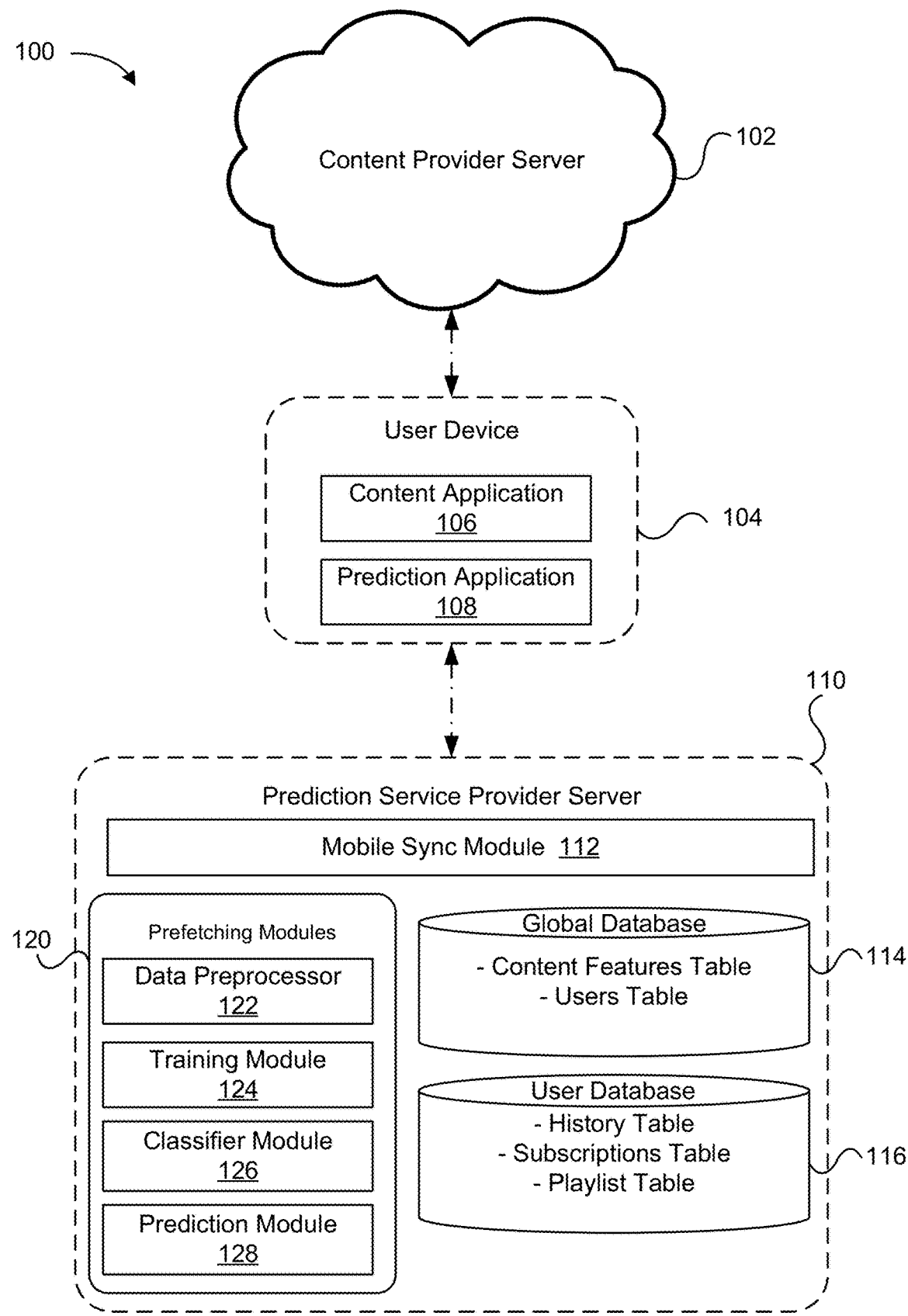
FIG. 1 illustrates a system for prefetching content from a content provider server to a user device, in accordance with the disclosed technology.

The disclosed technology relates to improved systems and methods for prefetching content for wireless users. The disclosed technology can include a system and method that can accurately predict which videos a user is likely to view in the near future via a video platform such as YouTube®, Hulu®, Facebook®, Instagram®, Twitter®, Flickr®, Vimeo®, Dailymotion®, Twitch®, or other video platforms. The system and method can further determine which videos of the predicted videos should be prefetched during an off-peak load demand time to reduce the amount of data downloaded by a user during peak load demand times. As will be appreciated by one of skill in the art, the disclosed technology can reduce the overall load on a wireless network during peak load demand times by shifting at least some of the load demand to off-peak load demand times without altering the user's normal use of the video platform.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. The presently disclosed subject matter is described in the context of being systems and methods for time-shifted prefetching of predicted content for wireless users. In particular, the disclosed subject matter is described in the context of being systems and methods for time-shifted prefetching of predicted videos that a wireless user is likely to view during peak load demand times. The present disclosure, however, is not so limited, and can be applicable in other contexts. The disclosed technology, for example, can be used to prefetch any data that a user is likely to need or want during peak load demand times on any wireless or wired network having load capacity limits and a variance in load demand. Accordingly, when the present disclosure is described in the context of systems and methods for time-shifted prefetching of predicted content for wireless users, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Referring now to the drawings, in which like numerals represent like elements, the present disclosure is herein described. FIG. 1 illustrates a system 100 for prefetching content from a content provider server 102 to a user device 104. As will be appreciated by one of skill in the art, the system 100 illustrated in FIG. 1 is offered for illustrative purposes and should not be construed as limiting the configuration of the system 100 as many configurations can be configured to perform the same or similar functions.

The system 100 can include a content provider server 102, a user device 104, and a prediction service provider server 110. Each of the content provider server 102, the user device 104, and the prediction service provider server 110 can at least include one or more processors and a memory storing instructions that can cause the content provider server 102, the user device 104, and the prediction service provider server 110 to execute various actions as described herein based on the instructions. For example, the instructions can cause the content provider server 102, the user device 104, and the prediction service provider server 110 to execute the method 200 illustrated in FIG. 2 and described herein.

The content provider server 102 can be any server used by a content provider to store and provide content that the user of the user device 104 would want to consume. As a non-limiting example, and as described herein throughout for illustrative purposes, the content provider server 102 can be a server of a provider of video content such as YouTube®, Hulu®, Facebook®, Instagram®, Twitter®, Flickr®, Vimeo®, Dailymotion®, Twitch®, or other video platforms. The disclosed technology, however, is not so limited and can be applied to other situations where data should be prefetched to a user device 104.

The content provider server 102 can be in wireless communication with the user device 104 via a wireless network such as a cellular or mobile network. Similarly, the prediction service provider server 110 can be in wireless communication with the user device 104 via a wireless network such as a cellular or mobile network. Alternatively, or in addition, the user device 104 can be in communication with the content provider server 102 and the prediction service provider server 110 via other communication networks such as broadband, Digital Subscriber Line (DSL), cable, satellite, etc. when such options are available. For example, the user device 104 can be configured to connect to a WiFi network that is connected to a cable internet connection to reduce cellular data usage and to facilitate communication with the content provider server 102 and the prediction service provider server 110.

The user device 104 can be or include any type of user device that a user of the user device may use to view or consume data. For example, the user device 104 can be a mobile phone, a tablet, a laptop computer, a smart device, a television, smart exercise equipment, or any other user device that can be configured to download and display the content that the user desires to view. The user device 104 can include a content application 106 and a prediction application 108, both of which can be downloaded to the user device 104 or can be preinstalled on the user device when purchased by the user (e.g., bloatware installed by the wireless provider or device manufacturer).

The content application 106 can be configured to facilitate communication between the user device 104 and the content provider server 102. As an example, the content application 106 can be a YouTube® application configured to download and display videos from a YouTube® server. Similarly, the prediction application 108 can be a separate application that can be configured to facilitate communication between the user device 104 and the prediction service provider server 110. Although illustrated in FIG. 1 and described herein as being two separate applications, one of skill in the art will appreciate that the content application 106 and the prediction application 108 can be combined into a single application to perform the functions described herein.

The prediction service provider server 110 can include a mobile sync module 112, a global database 114, a user database 116, and prefetching modules 120. The mobile sync module 112 can be configured to cause the prediction service provider server 110 to communicate and synchronize data with the user device 104 via the prediction application 108. As will become apparent throughout this disclosure, the disclosed technology can be configured to facilitate prefetching of data from the content provider server 102 to the user device 104 to help reduce the peak load demand on a wireless network and to provide an enjoyable user experience. To help facilitate the prefetching, the mobile sync module 112 can be configured to periodically facilitate communication between the prediction service provider server 110 and the user device 104. As a non-limiting example, the mobile sync module 112 can be configured to facilitate communication between the user device 104 and the prediction service provider server 110 at least daily to ensure that relevant videos are prefetched to the user device 104. For example, the mobile sync module 112 can be configured to facilitate communication between the user device 104 and the prediction service provider server 110 during an off-peak load demand time (i.e., in the middle of the night or the early morning hours) to facilitate prefetching of relevant videos to the user device 104.

The global database 114 can include a video features table and a user table. The video features table can contain metadata about videos stored in the prediction service provider server 110 while the users table can include data about each user who receives service from the prediction service provider server 110 with each user being identified by a user identification number. The user database 116 can be configured to contain data about each user's viewing habits and history. For example, the user database 116 can include a history table that can contain data about each video the user has viewed, a subscriptions table that can contain data about each subscription that the user has subscribed to (e.g., which video channels the user is subscribed to), and a playlist table that can contain data about playlists of videos the user has made. As will be described in greater detail herein, the disclosed technology can be configured to use data from the global database 114 and the user database 116 to predict which videos the user is most likely to view at a future date (e.g., during the next peak load demand time) and output instructions to the user device 104 to facilitate prefetching of these predicted videos.

The prefetching modules 120 can include a data preprocessor 122, a training module 124, a classifier module 126, and a prediction module 128. Together, the prefetching modules 120 can be configured to receive video data specific to a user, analyze the video data, predict which videos the user is likely to view at a future date (e.g., during the next peak load demand time), and output instructions to the user device 104 to cause the user device 104 to prefetch the predicted videos from the content provider server 102 and to the user device 104.

The data preprocessor 122 can be configured to process the user's video watch history. For example, the data preprocessor 122 can be configured to retrieve a video watch history of all videos watched by the user during a predetermined amount of time. The video watch history can be retried from the content application 106 on the user device 104, from the content provider server 102, and/or from the history table in the user database 116. The predetermined amount of time can be one day, several days, a week, several weeks, a month, several months, a year, several years, or the user's entire video watch history that is available. The data preprocessor 122 can also be configured to retrieve 122 the user's subscription data, playlist data, preferred channel data, preferred category data, and other available data that is indicative of the user's video watch history and preferences. The data preprocessor 122 can also be configured to retrieve related video data or recommended video data from the content provider server 102. The related video data and recommended video data can include all data that is indicative of a video determined to be related to a video viewed by the user or recommended by the content provider.

The training module 124 can include a classifier (such as a k-nearest neighbor classifier, as will be described in greater detail herein) that is configured to receive and analyze the data retrieved by the data preprocessor 122. The training module 124 can be used to train the classifier such that the classifier can more accurately and precisely classify videos over time. The classifier module 126 can be used to classify all of the related videos retrieved by the data preprocessor 122 to help filter out videos that are less likely to be viewed by a user. The prediction module 128 can be configured to determine which videos should be prefetched by the user device 104 from the content provider server 102. In other words, the prediction module 128 can be configured to predict which videos of a given video data set are likely to be viewed by the user during the next peak load demand time. As will be appreciated by one of skill in the art, the prediction module 128 must be capable of determining which videos a user is likely to view in the near future as well as determine the videos most likely to be viewed by the user in the near future to reduce the total number of videos that will be prefetched to the user device 104. In this way, the disclosed technology can reduce the amount of data that is downloaded to the user device 104 but not viewed or used by the user of the user device 104 (i.e., increase the efficiency of prefetching videos to the user device 104).

Although not shown in FIG. 1, the system 100 can include a transparent HTTPs caching proxy that can be located in a communication path between the prediction application 108 and the content provider server 102 with the transparent HTTPs caching proxy residing on the user device 104. In this configuration, all of the prediction application 108 actions can be performed and prefetched by the HTTPs caching proxy.

Figure 2:
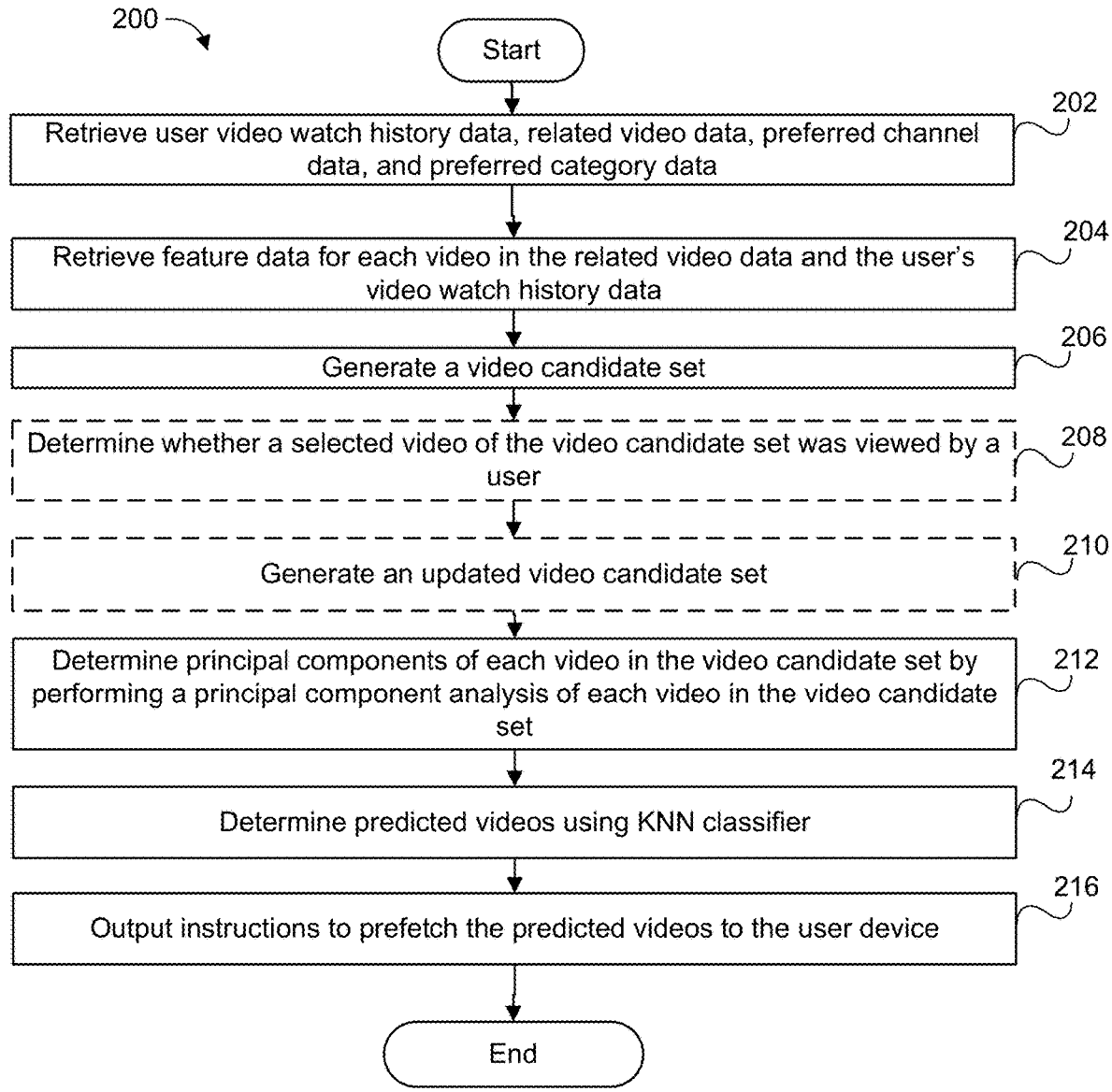
FIG. 2 is an illustration of a method of prefetching content from a content provider server to a user device, in accordance with the disclosed technology.

FIG. 2 is an illustration of a method 200 of prefetching content from a content provider server (e.g., content provider server 102) to a user device (e.g., user device 104), in accordance with the disclosed technology. The method 200 can be executed entirely on the prediction service provider server 110 using the prefetching modules 120 described previously. Alternatively, or in addition, all or a portion of the method 200 can be executed on the user device 104 itself if so configured.

The method 200 can include retrieving data related to the user's video watch history, behavior, and preferences. For example, the method 200 can include retrieving 202 the user's video watch history data, related video data, preferred channel data, and preferred category data. The video watch history data, preferred channel data, and preferred category data can each be retrieved from the content provider server 102, the content application 106 on the user device 104, and/or from the user database 116 on the prediction service provider server 110. The video watch history data can be all of the available data corresponding to each video that the user has viewed in the past. The method 200 can include retrieving all available data related to any video ever viewed by the user or retrieving only video data related to videos recently viewed by the user. For example, user video watch history data can be data corresponding to all videos viewed by the user in the past day, the past several days, the past week, the past several weeks, the past month, the past several months, the past year, the past several years, or even a complete download of the user's entire video watch history. The preferred channel data and preferred category data can be data related to channels and categories that the user has indicated he or she enjoys or would prefer to view content from. In addition, the preferred channel data and category data can include data related to any channels or categories that the user would prefer not to view videos from.

The related video data can be retrieved from the content provider server 102 or from the content application 106 if so configured. As will be appreciated by one of skill in the art, the related video data can include data from the content provider for each video that the content provider has determined is related to a video watched by the user. For example, and not limitation, if the user has viewed ten videos, the related video data can include ten additional videos related to each of the ten videos viewed by the user that the content provider has determined is related to each video (i.e., 100 additional related videos in total). This can include both videos that the content provider's algorithm determines should be recommended to the user and videos that the content provider's algorithm determines have features that are related to the videos viewed by the user. Alternatively, or in addition, recommended video data can be retrieved from the content provider server 102 or from the content application 106. Recommended video data can include data about videos that the content provider has determined should be recommended to the user.

The method 200 can include retrieving 204 feature data for each video in the video candidate set and each video in the user's video watch history. The feature data can be or include any of the features listed in the chart depicted in FIG. 4. For example, the feature data can be or include a retrieval date, time difference data, views data, likes data, dislikes data, comments data, channel identification data, category identification data, subscriber data, upload data, subscribed data indicative of whether the user is subscribed to the video's channel, repeat data indicative of the number of times a user has watched the video, playlist data indicative of whether the video appears in a user's created playlist, and/or tag data associated with the video. Additionally, the feature data can include data indicative of temporal features about the videos, future trends of the videos, and past user interactions with the videos. The feature data can be stored as metadata for each video retrieved from the user's video watch history data and the related videos data.

Figure 5:
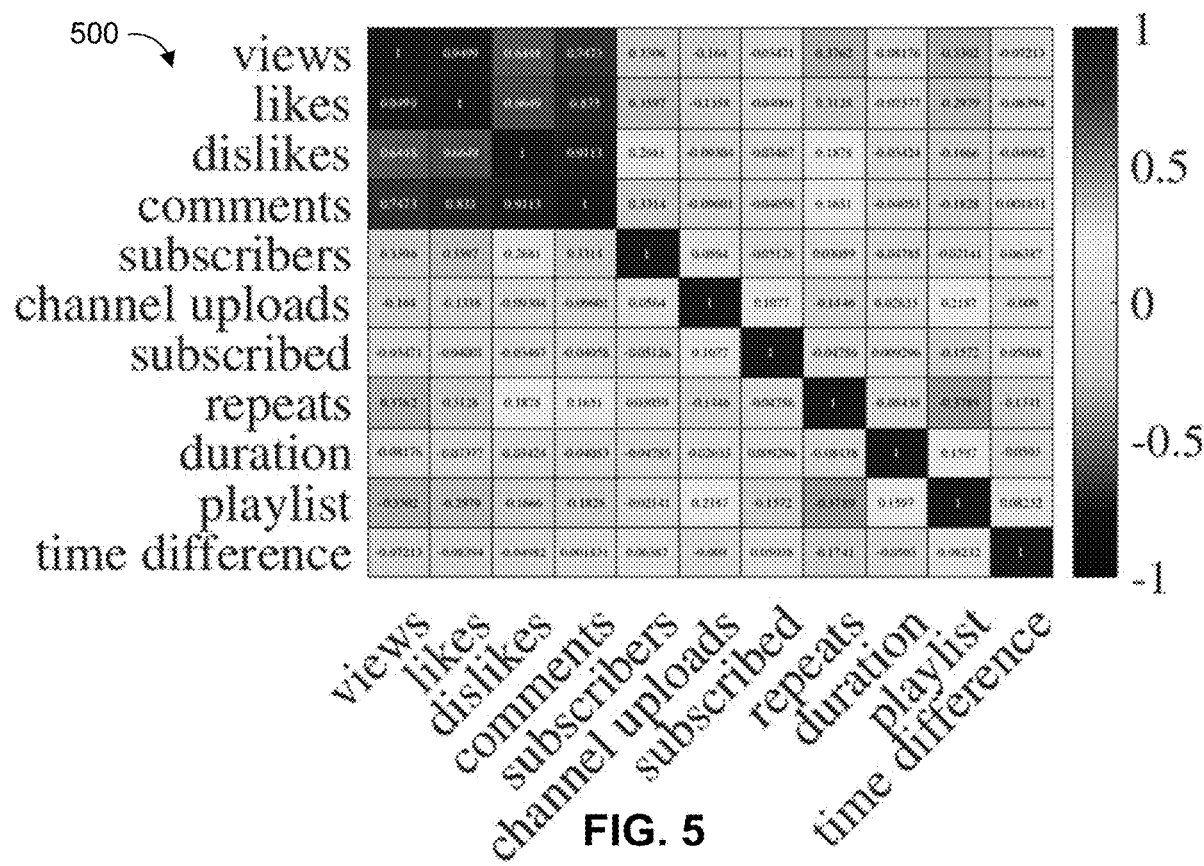
FIG. 5 is a chart showing the Pearson correlation matrix containing correlations of every pair of features in the table 400 of FIG. 4, in accordance with the disclosed technology.

FIG. 5 is a chart showing the Pearson correlation matrix 500 containing correlations of every pair of features in the table of FIG. 4. The coefficients shown in FIG. 5 are averaged across a watch history of a sample data set of 206 users, made up of 1,116,271 unique videos. As will be appreciated by one of skill in the art, there is a strong relationship between four features for a video—the number of views, likes, dislikes, and number of comments. This demonstrates that there is considerable redundancy present in the features for this particular data set.

The method 200 can include generating 206 a video candidate set based on at least the feature data, the preferred channel data, and/or the preferred category data. For example, the method 200 can include comparing the feature data of each video in the related video data and removing any videos that are not related to the user's preferred channels and/or preferred categories. The remaining videos that are related to the user's preferred channels and/or preferred categories can be retained or stored to make up the video candidate set. This can be particularly helpful for reducing the overall number of videos to be analyzed because a user is much more likely to view a video from his or her preferred channel or category than other videos that are not part of his or her preferred channel or category.

Optionally, the method 200 can include determining 208 whether a selected video of the video candidate set was viewed by a user. As will be appreciated, this function can be performed after a user has had time to view the videos in the video candidate set. For example, if the video candidate set was generated 206 at an earlier time, the method 200 can include determining 208 whether a selected video of the video candidate set was viewed by a user since the time the video candidate set was first generated. In other words, determining 208 whether a selected video of the video candidate set was viewed by a user would likely not be executed on the first time the method 200 is performed but may be executed on subsequent times the method 200 is performed. Determining 208 whether a selected video of the video candidate set was viewed by a user can include parsing through the video candidate set to determine which videos of the video candidate set was viewed by the user either recently (e.g., on a selected day) or at any point in the past. If the video was viewed by the user, the method 200 can include generating 210 an updated video candidate set comprising the videos that were viewed by the user.

The method 200 can include determining 212 principal components of each video in the video candidate set (either the video candidate set or the updated video candidate set) by performing a principal component analysis (PCA) of the feature data of each video in the video candidate set. PCA is a statistical analysis technique that uses an orthogonal transformation to convert a set of features into a set of linearly uncorrelated variables called principal components. The principal components are computed in such a way, that the greatest variance by some projection of the original features, lies on the first coordinate (called the first principal component), the second greatest variance on the second coordinate, and so forth. Details of the PCA algorithm can be found in "Principal Component Analysis" by H. Abdi and L. J. Williams (H. Abdi and L. J. Williams, "Principal component analysis," WIREs Comput. Stat., vol. 2, no. 4, pp. 433-459, July 2010. [Online]. Available: https://doi.org/10.1002/wics.101).

Figure 6:
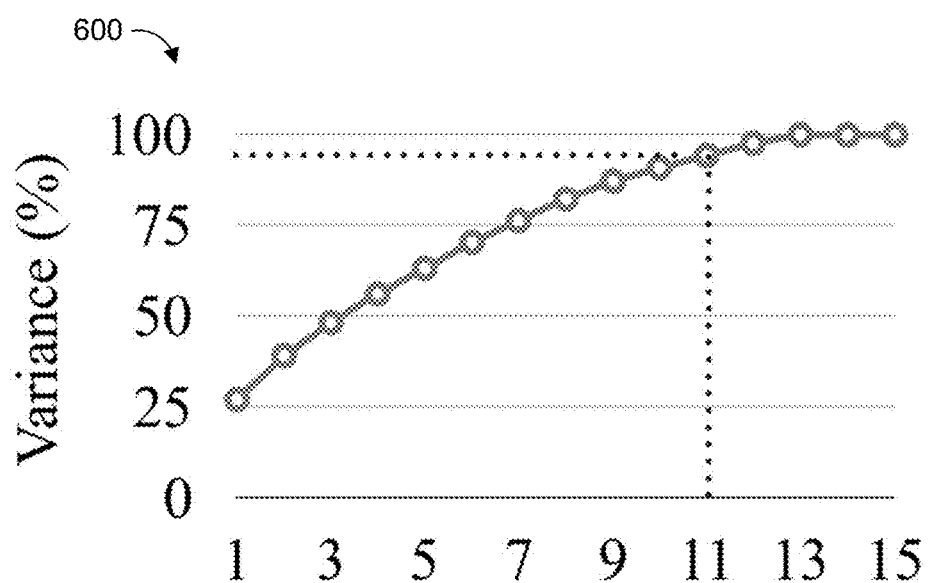
FIG. 6 is a chart showing the cumulative variance contributed by each of the principal components of the feature data, in accordance with the disclosed technology.

FIG. 6 is a chart showing the cumulative variance 600 contributed by each of the principal components of the feature data of a data set of 206 users, made up of 1,116,271 unique videos. As will be appreciated by one of skill in the art, approximately 95% of the variance is captured within the first 11 principal components of the feature data. Thus, the disclosed technology can reduce the number of dimensions for calculation from 15 to 11, thereby reducing the computational complexity associated with large datasets, while still capturing significant variance within the dataset. The 11 principal components can then be used by the disclosed technology to classify which videos to prefetch.

Each of the portions 202-212 of method 200 can be used to compile data that can be loaded into a classifier (as will be described in greater detail here). The portions 202-212 of method 200 can be used to train the classifier so that the classifier will become more efficient and accurate at predicting videos over time. In other words, the method 200 can include two facets, a training portion a prediction portion. FIG. 3 illustrates a table 300 showing pseudocode of the training portion of the method 200 that can be used to train a classifier used to prefetch content from a content provider server to a user device. As illustrated in FIG. 3, after the portions 202-212 of the method 200 are used to compile the video data that correspond to the video candidate set (or updated video candidate set), the video data (i.e., training data) can be loaded into the classifier.

As part of the prediction portion of the method 200, the method 200 can include determining 214, based on the principal components, predicted videos using a k-nearest neighbor (KNN) classifier. The predicted videos, for example, can be videos of the video candidate set (either the video candidate set or updated video candidate set) that are likely to be viewed by a user at a future time (e.g., during the next peak load demand time). The KNN classifier is a supervised neighbors-based learning method that predicts the label for a sample based on the labels of a predefined number of training samples (K) closest in Euclidean distance to the sample to be classified. Details of the KNN classifier can be found in "Local Learning Algorithms" by L. Bottou and V. Vapnik (L. Bottou and V. Vapnik, "Local Learning Algorithms," Neural Computation, vol. 4, no. 6, pp. 888-900, 1992. [Online]. Available: https://doi.org/10.1162/neco.1992.4.6.888). KNN then assigns a class (chosen or discarded) to the video based on the majority of classes present in the closest K points. As the KNN classifier directly classifies data samples based on feature similarity, it can be effectively applied to prefetching. As will be appreciated by one of skill in the art, other machine learning algorithms such as the Gaussian Naive Bayes (GNB), linear support vector machine (SVM), and also random forests (RF) can be used with the disclosed technology in place of the KNN classifier. However, for illustrative purposes, the disclosed technology is described in relation to the KNN classifier. Furthermore, KNN was chosen as the classifier for this particular illustrative implementation as a result of test data showing that the KNN classifier was more effective than the other mentioned classifiers.

Figure 7:
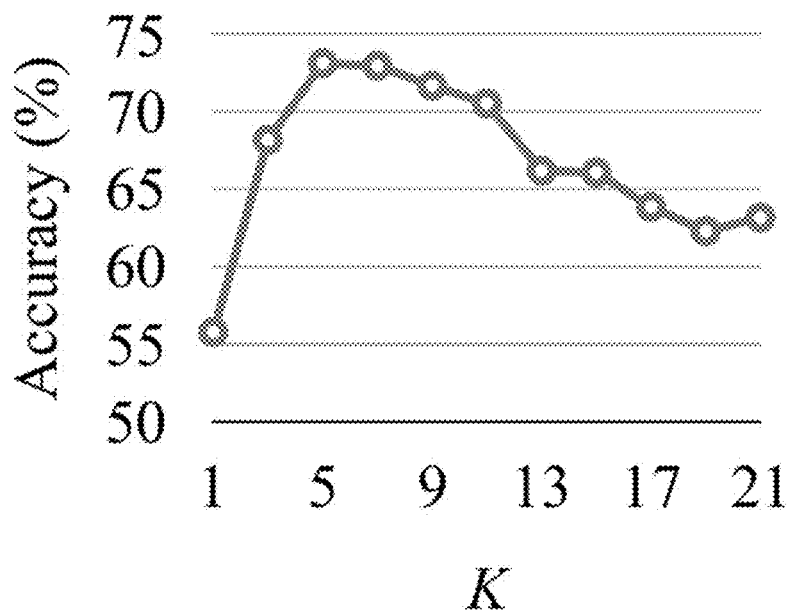
FIG. 7 is a chart showing the accuracy of the k-nearest neighbors classifier when the K value is varied, in accordance with the disclosed technology.
Figure 8:
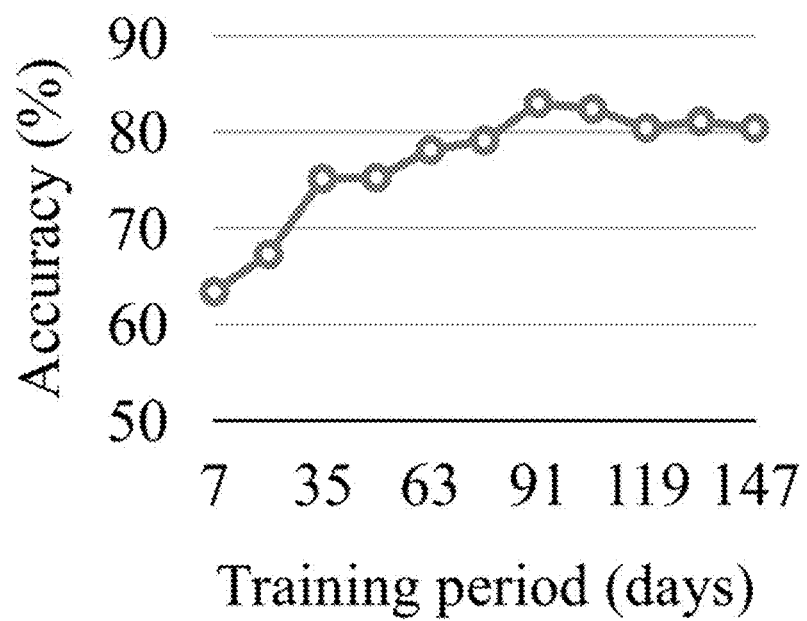
FIG. 8 is a chart showing the accuracy of the k-nearest neighbors classifier when the number of days in the training period is varied, in accordance with the disclosed technology.

There are two important parameters for the KNN classifier, namely the value of K, the number of neighbors in the KNN algorithm, and also the training period. The effect of varying the number of neighbors used by the classifier (averaged across 10-fold cross-validation), is shown in chart 700 in FIG. 7; showing that the optimal value for K can be found to be 5 in some situations. As will be appreciated by one of skill in the art, training the KNN classifier on the user's entire watch-history data can result in over-fitting and may be computationally inefficient. Furthermore, in doing so, you may not be able to take into account the temporal variance of the data i.e. the way the user's viewing behavior changes over time. As illustrated in the chart 800 in FIG. 8, when a sample data set was analyzed, the classifier performance peaked at a training period of approximately 90 days, after which there was a slight decrease. Thus, the training period can be set to 90 days in some examples. As will be appreciated by one of skill in the art, the K value and number of days for the training period can be varied depending on the particular application and the data being analyzed and predicted for prefetching.

Once the predicted videos have been determined using the classifier, the method 200 can include outputting 216 instructions to the user device to prefetch the predicted videos by downloading the predicted videos to the user device. This means that the next time the user watches a video, and if that video has been prefetched during off-peak load demand time as a background process, the user device will fetch the video from the offline download folder and present the video to the user just like any other video. In other words, the disclosed technology can facilitate a user viewing videos without affecting the user's usual viewing habits. The offline download folder can be part of the content application 106 or a separate folder on the user device 104.

Figure 9:
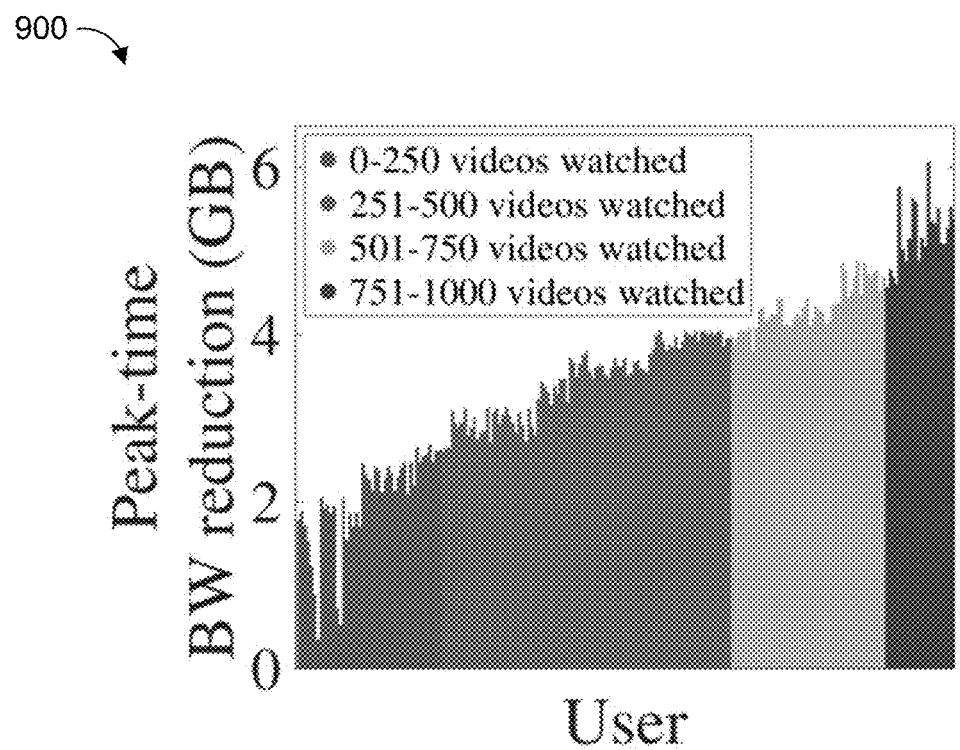
FIG. 9 is a chart showing the bandwidth reduction per user when the disclosed technology was used by a sample set of users, in accordance with the disclosed technology.
Figure 10:
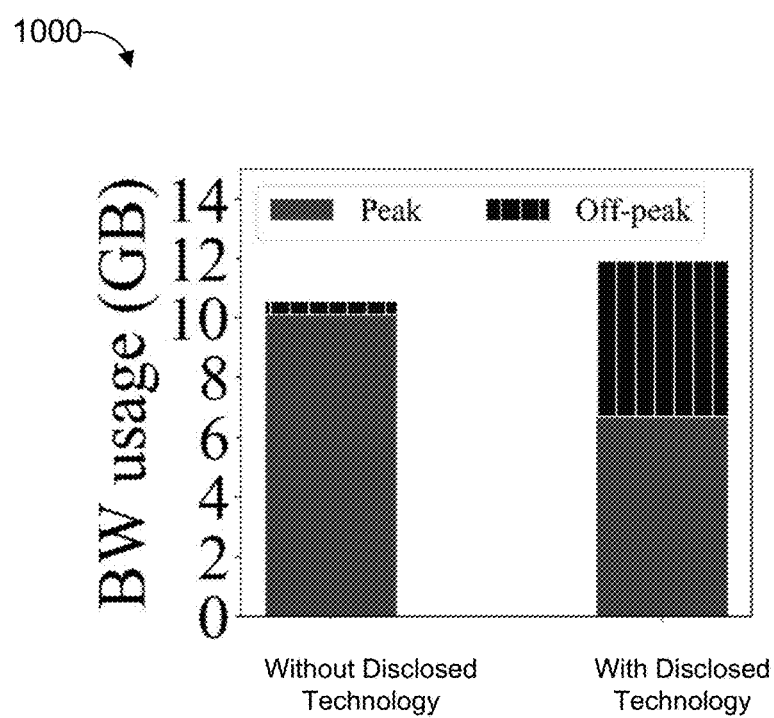
FIG. 10 is a chart showing the amount of data downloaded during off-peak times and peak times with the disclosed technology and without the disclosed technology for a sample set of users, in accordance with the disclosed technology.

The disclosed technology can determine an efficient time to prefetch the predicted videos to the user device. In some examples, the disclosed technology can be configured to prefetch the predicted videos during an off-peak load demand time such as during the middle of the night or the early morning hours when the load on the cellular network is likely to be less than a peak load demand. As will be appreciated by one of skill in the art, by prefetching the predicted videos during an off-peak load demand time, the disclosed technology can help to distribute the load on the cellular network throughout the day such that the peak load demand will be reduced. The impact of disclosed technology can be shown in terms of the bandwidth (BW) consumption for the users on a cellular network. When the disclosed technology is implemented, and predicted videos are prefetched during off-peak load demand hours, there is a decrease in the BW consumed by the users during peak load demand times. This decrease corresponds to a smoothening of the network traffic demand curve. FIG. 9 illustrates a chart 900 of the BW reduction for a given sample of users when the disclosed technology is implemented. The BW reduction per user in the sample set during peak load demand times is shown as a function of the number of videos watched by the user over the test period. On average, a BW savings of 3.3 GB across the 206 sample users can be observed (this is computed based on prefetching and watching videos at 480p quality). FIG. 10 illustrates a chart 1000 the per-user BW consumption for peak and off-peak load demand times, with and without the use of the disclosed technology, across the same sample set of users. The disclosed technology is able to achieve a peak-time BW reduction of 34% while increasing the overall BW consumption by 12% (from 10.6 Gb to 11.9 Gb). As will be appreciated by one of skill in the art, the results illustrated in FIG. 9 and FIG. 10 are merely for illustrative purposes and should not be construed as limiting as the actual results of using the disclosed technology can vary by the number of users, the data being prefetched, and the particular configuration of the system and method.

The disclosed technology can also be configured to prefetch predicted videos when the user device 104 is connected to other wireless or wired networks that may be more cost efficient to use such as WiFi. For example, when the user device 104 connects to a WiFi network, the disclosed technology can recognize that the user device 104 is connected to a WiFi network and implement the method 200 to prefetch the predicted videos. As will be appreciated, by prefetching the predicted videos when the user device 104 is connected to a WiFi network can further help to reduce the load demand on the cellular network by shifting some of the downloaded content to cheaper networks such as WiFi when available.

Figure 11:
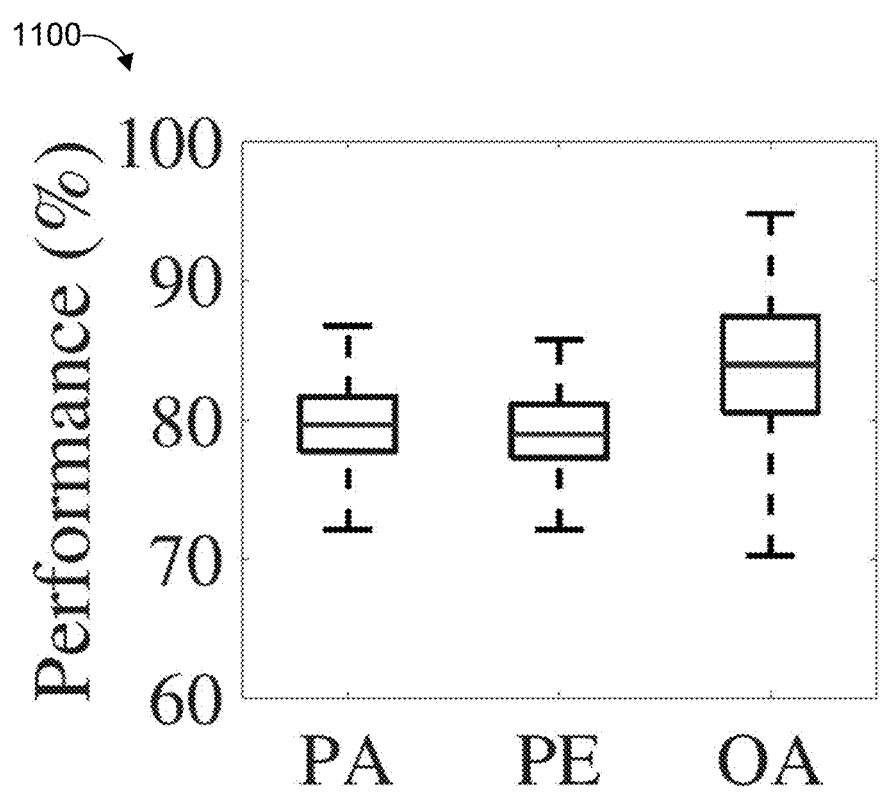
FIG. 11 is a chart showing the accuracy and efficiency of the disclosed technology for a sample set of users, in accordance with the disclosed technology.

FIG. 11 is a chart 1100 showing the accuracy and efficiency of the disclosed technology for a sample set of users, in accordance with the disclosed technology. Prefetch Accuracy (PA) is the fraction of watched videos that have been prefetched, over the total number of watched videos, prefetch efficiency (PE) is the fraction of the watched videos among the prefetched videos, and overall efficiency (OA) is the fraction of correctly classified videos among the entire candidate set. As illustrated, for a given sample set of users the disclosed technology is able to accurately select 79.3% of the predictable videos from the candidate set, and of the videos that are prefetched, 79.1% of the videos are watched by the user. In, addition the average prefetch selectivity (PS), or the fraction of prefetched videos among the candidate set of videos, is 29.3%, which means that the algorithm is able to fetch 29.3% from the candidate set; the PE from the entire unfiltered dataset is less than 0.001%. Furthermore, the disclosed technology is able to correctly classify 83.2% of the videos in the filtered candidate set. As will be appreciated by one of skill in the art, the disclosed technology can significantly increase the effectiveness of prefetching content when compared to existing prefetching systems because the disclosed technology can selectively prefetch content that the user is likely to consume rather than downloading a large amount of content or data that will not be used by the user. Furthermore, the disclosed technology can learn the important aspects of the user's past behavior, and how these aspects evolve over time, to successfully predict which videos from the candidate set the user is likely to view during the next peak load demand time.

As will be appreciated, the methods described herein can be varied in accordance with the various elements and implementations described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method.

While the present disclosure has been described in connection with a plurality of example aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims. Moreover, various aspects of the disclosed technology have been described herein as relating to methods, systems, devices, and/or non-transitory, computer-readable medium storing instructions. However, it is to be understood that the disclosed technology is not necessarily limited to the examples and embodiments expressly described herein. That is, certain aspects of a described system can be included in the methods described herein, various aspects of a described method can be included in a system described herein, and the like.

What is claimed is:

1. A method of prefetching video data from a content provider server to a user device, the method comprising:
retrieving user data, the user data comprising a user's video watch history data, preferred channel data, and preferred category data;
retrieving, from the content provider server, related video data based, at least in part, on the user's video watch history data;
retrieving, from the related video data and the user's video watch history data, feature data, the feature data comprising data indicative of features of each video in the related video data and the user's video watch history data;
generating, based on the user data and the feature data, a video candidate set comprising selected videos of the related video data;
generating video candidate feature data comprising data indicative of features of each video in the video candidate set;
determining, based at least in part on the video candidate feature data, principal components of each video in the video candidate set by performing a principal component analysis of each video in the video candidate set;
determining, based at least in part on the principal components and a k-nearest neighbor (KNN) classifier, predicted videos, the predicted videos being a subset of videos of the video candidate set; and
outputting instructions to the user device to prefetch the predicted videos by downloading the predicted videos to the user device.

2. The method of claim 1 further comprising:
determining whether a video of the video candidate set was viewed by a user;
in response to determining that a video of the video candidate set was viewed by the user, generating an updated video candidate set;
determining, based on feature data of the updated video candidate set, updated principal components of each video in the updated video candidate set by performing the principal component analysis of each video in the updated video candidate set; and
outputting the updated principal components to the KNN classifier for training of the KNN classifier.

3. The method of claim 1, wherein the user's video watch history data comprises the user's video watch history data over a predetermined amount of time.

4. The method of claim 1, wherein the predicted videos are a subset of videos of the video candidate set that are likely to be viewed by a user at a future time.

5. The method of claim 1, wherein the user's video watch history data is retrieved from the content provider server.

6. The method of claim 1, wherein the user's video watch history data is retrieved from the user device.

7. The method of claim 1, wherein the related video data comprises related video data that is based, at least in part, on each video in the user's video watch history data.

8. The method of claim 1, further comprising:
  determining whether a wireless network is likely to have a current load demand that is less than a predetermined load demand threshold,
  wherein the step of outputting instructions to the user device to prefetch the predicted videos by downloading the predicted videos to the user device occurs in response to determining that the wireless network is likely to have a current load demand less than the predetermined load demand threshold.

9. The method of claim 8, wherein the predetermined load demand threshold is based on a peak load demand.

10. The method of claim 8, wherein determining whether a wireless network is likely to have a current load demand that is less than a predetermined load demand threshold is based, at least in part, on a time of day.

11. The method of claim 1, further comprising:
  determining whether the user device is connected to a WiFi network,
  wherein the step of outputting instructions to the user device to prefetch the predicted videos by downloading the predicted videos to the user device occurs in response to determining that the user device is connected to the WiFi network.

12. A system for prefetching video data from a content provider server to a user device, the system comprising:
  one or more processors; and
  a memory in communication with the one or more processors and storing instructions that, when executed by the one or more processors, cause the system to:
    retrieve user data, the user data comprising a user's video watch history data, preferred channel data, and preferred category data;
    retrieve, from the content provider server, related video data based, at least in part, on the user's video watch history data;
    retrieve, from the related video data and the user's video watch history data, feature data, the feature data comprising data indicative of features of each video in the related video data and the user's video watch history data;
    generate, based on the user data and the feature data, a video candidate set comprising selected videos of the related video data;
    generate video candidate feature data comprising data indicative of features of each video in the video candidate set;
    determine, based on the video candidate feature data, principal components of each video in the video candidate set by performing a principal component analysis of each video in the video candidate set;
    determine, based at least in part on the principal components and a k-nearest neighbor (KNN) classifier, predicted videos, the predicted videos being a subset of videos of the video candidate set; and
    output instructions to the user device to prefetch the predicted videos by downloading the predicted videos to the user device.

13. The system of claim 12, wherein the instructions, when executed by the one or more processors, are further configured to further cause the system to:
  determine whether a video of the video candidate set was viewed by a user;
  in response to determining that a video of the video candidate set was viewed by the user, generate an updated video candidate set;
  determine, based on feature data of the updated video candidate set, updated principal components of each video in the updated video candidate set by performing the principal component analysis of each video in the updated video candidate set; and
  output the updated principal components to the KNN classifier for training of the KNN classifier.

14. The system of claim 13, wherein determining whether a wireless network is likely to have a current load demand that is less than a predetermined load demand threshold is based on a time of day.

15. The system of claim 13, wherein the instructions, when executed by the one or more processors, are further configured to cause the system to:
  determine whether the user device is connected to a WiFi network,
  wherein the step of outputting instructions to the user device to prefetch the predicted videos by downloading the predicted videos to the user device occurs in response to determining that the user device is connected to the WiFi network, output instructions to the user device to prefetch the predicted videos.

16. The system of claim 12, wherein the user's video watch history data is retrieved from the content provider server.

17. The system of claim 12, wherein the user's video watch history data is retrieved from the user device.

18. The system of claim 12, wherein the related video data comprises related video data that is based, at least in part, on each video in the user's video watch history data.

19. The system of claim 12, wherein the instructions, when executed by the one or more processors, are further configured to further cause the system to:
  determine whether a wireless network is likely to have a current load demand that is less than a predetermined load demand threshold,
  wherein the step of outputting instructions to the user device to prefetch the predicted videos by downloading the predicted videos to the user device occurs in response to determining that the wireless network is likely to have a current load demand less than the predetermined load demand threshold.

20. The system of claim 19, wherein the predetermined load demand threshold is based on a peak load demand.

* * * * *